(12) United States Patent　　(10) Patent No.: US 9,223,695 B2
Makuni et al.　　(45) Date of Patent: Dec. 29, 2015

(54) INFORMATION PROCESSING APPARATUS

(71) Applicant: Buffalo Memory Co., Ltd., Nagoya-shi (JP)

(72) Inventors: Kazuki Makuni, Nagoya (JP); Takayuki Okinaga, Nagoya (JP); Shuichiro Azuma, Nagoya (JP); Yosuke Takata, Nagoya (JP); Noriaki Sugahara, Nagoya (JP)

(73) Assignee: BUFFALO MEMORY CO., LTD., Nagoya-shi (JP)

( * ) Notice: Subject to any disclaimer, the term of this patent is extended or adjusted under 35 U.S.C. 154(b) by 172 days.

(21) Appl. No.: 13/927,881

(22) Filed: Jun. 26, 2013

(65) Prior Publication Data

US 2014/0006695 A1　　Jan. 2, 2014

(30) Foreign Application Priority Data

Jun. 27, 2012　　(JP) ................................ 2012-144642

(51) Int. Cl.
 *G06F 12/02* (2006.01)
(52) U.S. Cl.
 CPC .... *G06F 12/0246* (2013.01); *G06F 2212/7208* (2013.01)
(58) Field of Classification Search
 CPC .................... G06F 12/0246; G06F 2212/7208
 See application file for complete search history.

(56) References Cited

U.S. PATENT DOCUMENTS

| 2013/0124785 | A1  | 5/2013  | Xiong et al. |
| 2013/0282961 | A1* | 10/2013 | Minamimoto ................ 711/103 |

FOREIGN PATENT DOCUMENTS

| CN | 102511044  A  | 6/2012  |
| JP | 2006-31268   A  | 2/2006  |
| JP | 2007-279816 A  | 10/2007 |
| JP |    4340327  B1 | 10/2009 |
| JP | 2010-176398 A  | 8/2010  |
| JP | 2011-22760  A  | 2/2011  |

OTHER PUBLICATIONS

Office Action mailed Sep. 25, 2015 in Chinese Application No. 201310260163.9 (with English Translation)

* cited by examiner

*Primary Examiner* — Yong Choe
(74) *Attorney, Agent, or Firm* — Oblon, McClelland, Maier & Neustadt, L.L.P.

(57) ABSTRACT

An information processing apparatus including a NAND type flash memory; circuitry configured to control writing/reading of data to/from the NAND type flash memory; and an interface configured to connect the information processing apparatus to a host apparatus. The circuitry is configured to determine whether to erase data stored in a specific area within the NAND type flash memory by overwriting the data based on whether an overwrite command is received from the host apparatus via the interface; and erase a physical block including the specific area when it is determined to erase the data by removing electric charges in the NAND type flash memory in the physical block including the specific area.

11 Claims, 11 Drawing Sheets

INFORMATION PROCESSING APPARATUS

CROSS REFERENCE TO RELATED APPLICATIONS

The present application claims priority to Japanese Patent Application No. 2012-144642 filed on Jun. 27, 2012, the disclosure of which is hereby incorporated by reference in its entirety.

BACKGROUND OF THE DISCLOSURE

1. Field of the Disclosure

The present disclosure relates to a storage device which includes a NAND type flash memory and which is suitable for being used as a Solid State Drive (SSD).

2. Description of the Related Art

In recent years, an SSD has been adopted in a use application in which the SSD has been substituted as a storage device in a Personal Computer (PC) for a Hard Disc Drive (HDD) because the SSD has advantages that an access speed is high and power consumption is less as compared with the case of the HDD. In addition, the HDD is used not only in the PC, but also as a storage device of a built-in apparatus, and the number of cases where the SSD is adopted in the built-in apparatus as well has been increased.

A multi-function printer (hereinafter suitably referred to as "an MFP" in some cases) is known as an example of such a built-in apparatus. The multi-function printer is such that functions of a printer, a facsimile, a scanner, a copy machine, and the like are collected in one apparatus. In the MFP, a manuscript which a user, for example, desires to copy is placed on a platen, and the manuscript placed on the platen is scanned. Thus, data obtained through the scanning (hereinafter simply referred to as "scan data") is temporarily stored in a storage device such as an HDD for subsequent processing/work. Moreover, jobs such as printing and transmission with a facsimile are carried out based on the data thus scanned.

In such an MFP, the scan data which has been used after completion of the jobs such as the printing needs to be erased from the HDD in order to ensure the security. In the existing MFP using the HDD as the storage device, data to be overwritten such as pieces of data which are all "0," pieces of data which are all "1," or data having a predetermined pattern containing therein random numbers is overwritten to the scan data, thereby erasing the scan data.

When the SSD is substituted for the HDD mounted to the MFP, an MFP main body side gives an instruction to overwrite the data to be overwritten to the scan data in the manner as described above, thereby giving an instruction to erase the scan data. However, the NAND type flash memory is used as a storage medium of the SSD in the SSD in many cases. Thus, since it may be impossible for the NAND type flash memory to carry out a direct overwriting operation, there is required a time-consuming operation for writing the data to be overwritten to a block in which the scan data is stored after an erasing operation has been carried out for the block. In addition, in the NAND type flash memory, there is a given limit to the number of times of rewrite. As a result, it is possible that the operation described above is repetitively carried out, thereby shortening the life of the NAND type flash memory.

In the light of such problems, there is proposed an MFP which issues an erasing command from an MPF main body side to an SSD and carries out an erasing operation for a block in which the scan data is stored in accordance with the erasing command. This technique about the MFP, for example, is proposed in Japanese Patent No. 4,340,327.

However, in the existing MFP described above, the MFP main body prepares the unique erasing command for the specific block of the SSD. Also, the SSD carries out the erasing operation for the corresponding block in response to that the erasing command has been issued from the MFP main body. Generally, the HDD cannot carry out the operation for collectively erasing the data in the specific area. Accordingly, for the purpose of erasing the data, the data to be overwritten described above are written to the data in the specific area to carry out the data erasing operation. Therefore, in an interface having general versatility through which the HDD and a host apparatus such as the MFP main body are connected to each other, for example, in an AT Attachment (ATA) or an Small Computer System Interface (SCSI), no erasing command is prepared, and thus the overwrite erasing is carried out by using a normal data write command. For this reason, in the existing MFP described above, it is necessary to prepare a (vendor-dependent) erasing command peculiar to the MFP in order to carry out the SSD erasing operation. Therefore, a special specification change is required for the MFP main body.

The present disclosure has been made in the light of the problems described above, and it is therefore desirable to provide a storage device which is capable of being substituted for a versatile HDD without subjecting a host apparatus to a special specification change.

SUMMARY OF THE DISCLOSURE

According to the present disclosure, there is provided an information processing apparatus including a NAND type flash memory; circuitry configured to control writing/reading of data to/from the NAND type flash memory; and an interface configured to connect the information processing apparatus to a host apparatus. The circuitry is configured to determine whether to erase data stored in a specific area within the NAND type flash memory by overwriting the data based on whether an overwrite command is received from the host apparatus via the interface; and erase a physical block including the specific area when it is determined to erase the data by removing electric charges in the NAND type flash memory in the physical block including the specific area.

DETAILED DESCRIPTION OF EMBODIMENTS

Figure 1:
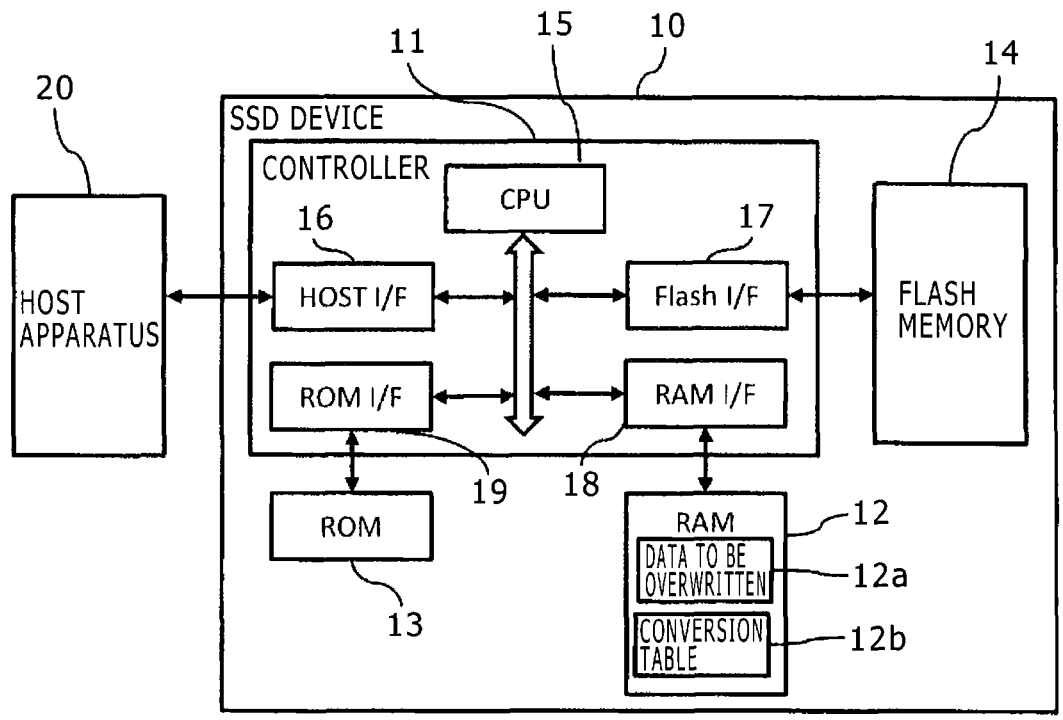
FIG. 1 is a block diagram showing a schematic configuration of an SSD device according to a first disclosure.
Figure 2:
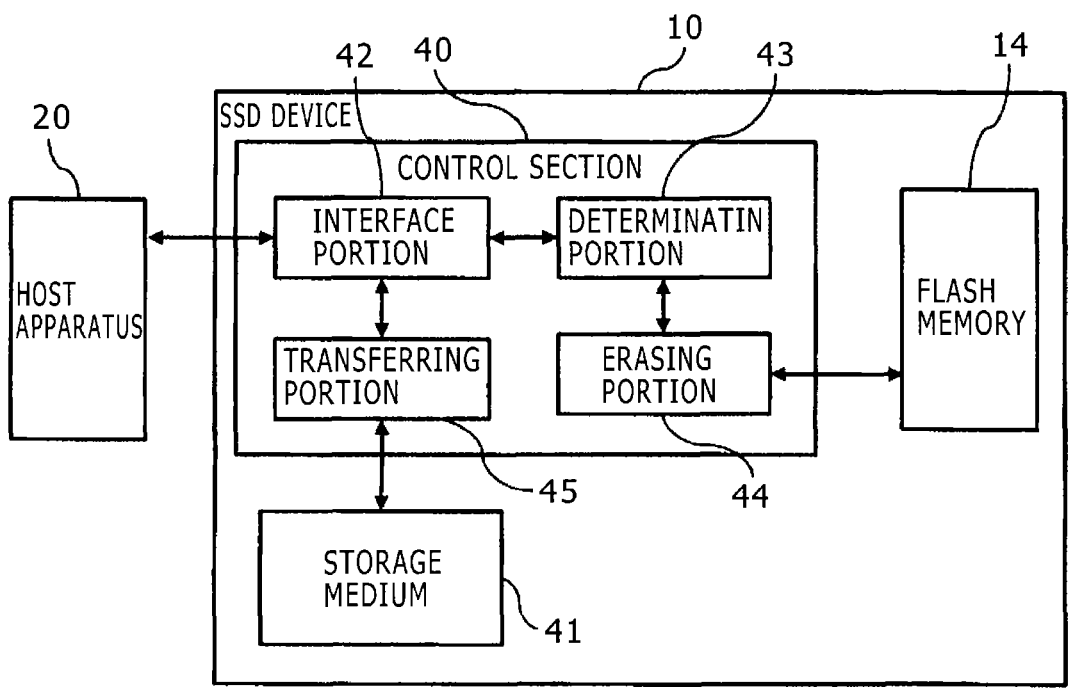
FIG. 2 is a functional block diagram explaining a function of the SSD device according to the first disclosure.

FIG. 1 is a block diagram showing a schematic configuration when a storage device according to a first disclosure is applied to a Solid State Drive (SSD) device. FIG. 2 is a functional block diagram explaining a function of the SSD device according to the first disclosure.

(Schematic Configuration of SSD Device)

In FIGS. 1 and 2, reference numeral 10 designates the SSD device according to the first disclosure. The SSD device 10 includes a controller 11, a Random Access Memory (RAM) 12, a Read Only Memory (ROM) 13, and a flash memory 14. The SSD device 10 according to the first disclosure is connected to a host apparatus 20 which, for example, is composed of a Multi-Function Printer (MFP). Thus, the SSD device 10 stores therein predetermined data in accordance with a write instruction given from the host apparatus 20, and sends predetermined data stored therein in accordance with a read instruction.

The controller 11 controls the entire SSD device 10. The controller 11 includes a Central Processing Unit (CPU) 15, a host interface (I/F) 16, a flash interface (I/F) 17, a RAM interface (I/F) 18, and a ROM interface (I/F) 19.

Firmware stored in the ROM 13 is developed in the RAM 12 in a phase of turning ON of a power source and is then executed, whereby the CPU 15 controls the controller 11 and thus the SSD device 10. Also, the CPU 15 includes functions shown in functional portions shown in FIG. 2. The functional portions shown in FIG. 2 will be described later. The host I/F 16 is connected to the host apparatus 20 through a predetermined external interface and transmits/receives data to/from the host apparatus 20 in conformity to a protocol or a command established by the external interface under the control made by the CPU 15. In the first disclosure, the host I/F 16 and the host apparatus 20 are connected to each other through an interface having general versatility which is frequently used in the Hard Disc Drive (HDD) or the like, for example, an AT Attachment (ATA) or a Small Computer System Interface (SCSI). The flash I/F 17 is connected to the flash memory 14 and carries out an operation for writing/reading out the data to/from the flash memory 14 under the control made by the CPU 15. The RAM I/F 18 is connected to the RAM 12 and carries out an operation for writing/reading out the data to/from the RAM 12 under the control made by the CPU 15. The ROM I/F 19 is connected to the ROM 13 and carries out an operation for reading out the data from the ROM 13 under the control made by the CPU 15.

The RAM 12 is used as a work memory for the controller 11, and various kinds of data are temporarily stored in the RAM 12. In addition, data 12a to be overwritten which is transmitted from the host apparatus 20 and is used to erase data obtained through scanning (scan data) in a specific area of the flash memory 14 is stored in the RAM 12. Also, a logical address-physical block conversion table 12b in which a correspondence relationship between a logical address and a physical block of the flash memory 14 is described is stored in the RAM 12. Whether the host apparatus 20 uses what kind of data to be overwritten to give an instruction to carry out overwrite erasing is uniquely determined by the host apparatus 20. Accordingly, the data 12a to be overwritten having the same pattern as that of the data to be overwritten which is sent from the host apparatus 20 is generated by the CPU 15 and is then stored in the RAM 12. In addition, the details of the logical address-physical block conversion table 12b will be described later. The firmware in accordance with which the SSD device 10 is controlled in the manner as described above is stored in the ROM 13.

(Logical Area or the Like of Flash Memory)

Figure 3:
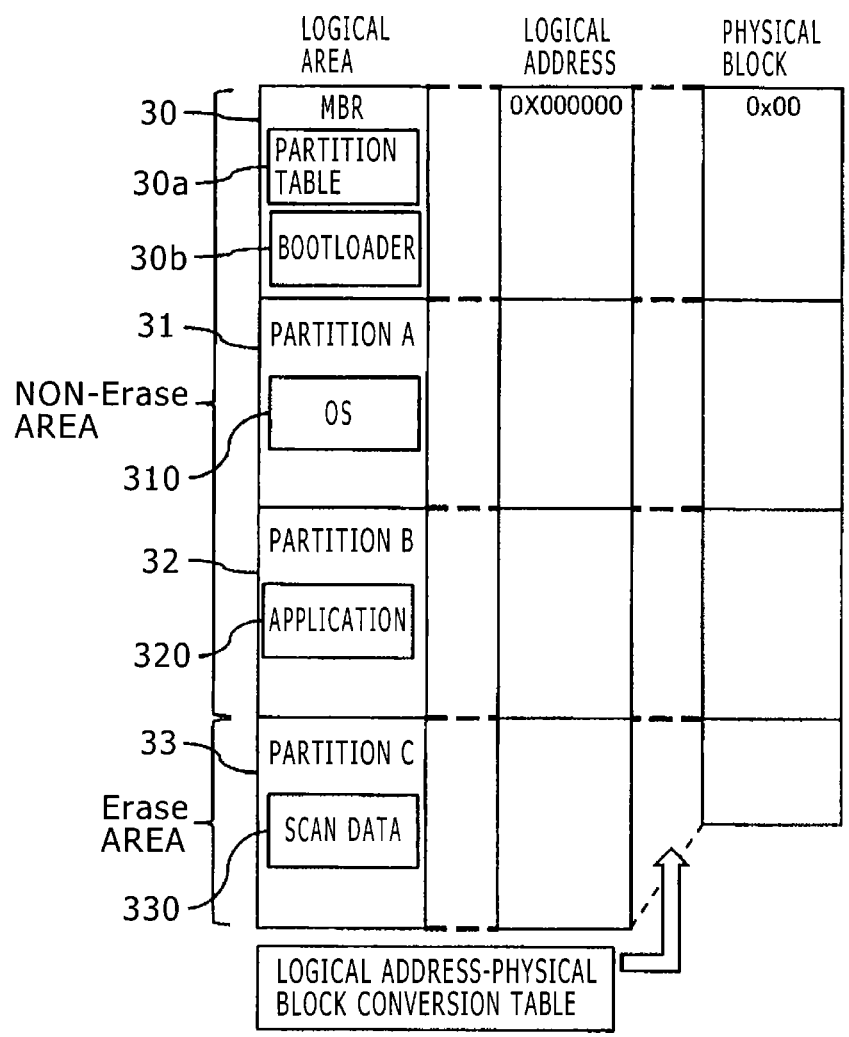
FIG. 3 is a diagram showing a relationship among a logical area, a logical address, and a physical block of the SSD device according to the first disclosure.

The flash memory 14 is a NAND type flash memory in the SSD device 10 of the first disclosure. The flash memory 14 has a logical area, a logical address, and a physical block as shown in FIG. 3. Hereinafter, the logical area, the logical address, and the physical block of the flash memory 14 will be described with reference to FIG. 3.

As shown in FIG. 3, the logical area of the flash memory 14 in the SSD device 10 according to the first disclosure is divided into a Master Boot Record (MBR) 30 and partitions A 31 to C 33. In the first disclosure, an operating system (OS) 310 for controlling the entire host apparatus 20 is stored in the partition A 31, an application program 320 for carrying out various kinds of operations of the host apparatus 20 is stored in the partition B 32, and the data which is temporarily used in the phase of various kinds of operations of the host apparatus 20 is stored in the partition C 33. SCAN DATA 330 (existing data) which is obtained through the scanning by the host apparatus 20 is contained in the data stored in the partition C 33. In addition, in the first disclosure, each of the MBR 30 and the partitions A 31 and B 32 is set as a non-Erase area in which even when the erasing instruction is given from the host apparatus 20, an erasing operation is rejected. Also, the partition C 33 is set as an Erase area in which the data can be erased in accordance with an erasing instruction given from the host apparatus 20. It is noted that in this specification, the word of "the partition" contains not only a partition which is managed by the OS 310 of the host apparatus 20 and described in the MBR 30, but also a partition, for a write area, which is not managed by the OS 310 and with which the application program 320 of the host apparatus 20 distinguishes a write destination address depending on the kinds of data.

Both of a partition table 30*a* and a boot loader 30*b* are stored in the MBR 30. Information on the partition of the flash memory 14 is stored in the partition table 30*a*. Specifically, position information (a start sector address and an end sector address), data on a kind, and data on a size of the partition are stored in the partition table 30*a* every partition.

The boot loader 30*b* is a code which is firstly read in a phase of activation of the SSD device 10. Specifically, when an electric power is supplied from a power source to the host apparatus 20, a bootstrap included in the host apparatus 20 is activated, and the bootstrap reads out the MBR (the partition table 30*a* and the boot loader 30*b*) within the flash memory 14 to the side of the host apparatus 20. Also, the boot loader 30*b* reads out the operating system 310 stored in the partition A 31 based on the information described in the partition table 30*a*, and sends the operating system 310 thus read out to the host apparatus 20. The host apparatus 20 develops the operating system 310 in a memory. Thus, after that, the control for the entire host apparatus 20 is carried out by the operating system 310. Here, the partition means one area when the logical address which the flash memory 14 has is divided into plural areas, and each of the partitions is recognized as one logical drive by the host apparatus 20. Such a partition has the same concept as that of the partition in the HDD.

In addition, in the first disclosure, a space within the flash memory 14 is grasped by the logical address (LBA: Logical Block Addressing) and the physical block. Thus, the host apparatus 20 directly specifies the logical address concerned, thereby making it possible to access the data in the specific area. When the logical address is directly specified by the host apparatus 20, the controller 11 specifies the physical block which is to be actually accessed by referring to the logical address-physical block conversion table 12*b* stored in the RAM 13 and accesses the physical block concerned.

It is noted that in the first disclosure, with regard to each of the MBR 30, and the partitions A 31 and B 32, the approximately same area is ensured for the logical address and the physical block, while with regard to the partition C 33, the partitions A 31 to C 33 are set in such a way that the area of the logical address becomes smaller than that of the physical block.

In addition, in the flash memory 14 in the SDD device 10 of the first disclosure, one physical block has plural pages. Thus, the operation for writing the data is carried out on a per-page basis, and the operation for erasing the data is carried out on a per-block basis. In addition, each of the pages is composed of plural sectors.

(Functional Configuration of SSD Device)

Next, FIG. 2 is a block diagram explaining a function of the SSD device 10 according to the first disclosure. The SSD device 10 according to the first disclosure includes a control section 40, the flash memory 14, and a storage medium 41.

The control section 40 controls the operation for reading out/writing the data from/to the flash memory 14. The control section 40 includes an interface portion 42, a determination section 43, an erasing portion 44, and a transferring portion 45. The interface portion 42 is connected to the host apparatus 20 through an interface having general versatility, for example, an ATA or an SCSI, and transmits/receives the data to/from the host apparatus 20 in conformity to a protocol or a command which is established by an external interface. The determination section 43 determines whether or not when a command received by the interface portion 42 is an overwrite command, the erasing of the existing data which has been stored in the specific area within the flash memory 14 is instructed from the host apparatus 20 in accordance with the command. When the determination section 43 determines that the erasing of the existing data which has been stored in the specific area within the flash memory 14 is instructed from the host apparatus 20, the erasing portion 44 instructs the physical block containing therein the specific area concerned to carry out erasing and removes away the electric charges accumulated in the flash memory 14 in the physical block containing therein the specific area concerned, thereby erasing the data in the physical block.

The data 12*a* to be overwritten (refer to FIG. 1) having the same pattern as that of the data to be overwritten which has been transmitted from the host apparatus 20 is held in the recording medium 41. When the transferring portion 45 is instructed to read out the data within the specific area of the flash memory 14 by the host apparatus 20, the transferring portion 45 transfers the data 12*a* to be overwritten within the storage medium 41 to the host apparatus 20 through the interface portion 42.

In the above description, the control section 40 is realized by the operation of the controller 11, especially, the CPU 15, the recording medium 41 is realized by the RAM 12, the interface portion 42 is realized by both of the host I/F 16 and the CPU 15, the determination section 43 is realized by the CPU 15, the erasing portion 44 is realized by both of the flash I/F 17 and the CPU 15, and the transferring portion 45 is realized by both of the host I/F 16 and the CPU 15.

(Outline of Operation of SSD Device)

Next, an outline of an operation of the SSD device 10 according to the first disclosure will now be described with reference to FIG. 4. In the SSD device 10 according to the first disclosure, firstly, the host apparatus 20 gives an instruction to write the scan data to a specific area 51 specified with the specific logical address within the flash memory 14. In the interface having the general versatility, this write instruction is given by issuing a Write command (Program command) which is prepared for the data write.

Next, the host apparatus 20 gives an instruction to erase the scan data which is present in the specific area 51 within the flash memory 14 with end of the job utilizing the scan data in the host apparatus 20 as a trigger. As described above, since in the interface having the general versatility, the command to directly erase the data is not prepared, the host apparatus 20 gives an instruction to erase the scan data in accordance with the Write command as a command to overwrite the data to be overwritten which is used to erase the scan data to the specific area 51 (to simply write the data because there is not a special command for deletion (erasing) in the interface having the general versatility in many cases).

When the SSD device 10 detects that the instruction to write the data to be overwritten which is used to erase the scan data has been given from the host apparatus 20, the SSD device 10 determines and interprets such a write instruction as the instruction to erase the scan data, and carries out the erasing operation for the physical block including the specific area 51 of the flash memory 14. Along with the erasing operation, the SSD device 10 updates the contents of the logical address-physical block conversion table 12*b*, and changes the correspondence between the logical address and the physical block in the specific area 51 for which the scan data has been erased to a logical address, and an address in which the data 12*a* to be overwritten within the RAM 12 is stored. Here, the determination as to whether or not such a write instruction is the instruction to erase the scan data is carried out based on the determination as to whether or not the data for which the instruction to make the coming of the Write command and to write the data has been given is the data to be overwritten, for example, predetermined pieces of data which are all "0," predetermined pieces of data which are all "1," or the data having a predetermined pattern containing therein random numbers. The details of such determination will be described later. In addition, the erasing operation in the NAND type flash memory 14 is carried out by removing away the electric charges from the electric charge layer for plural cells composing the specific physical block.

For the purpose of confirming whether or not the scan data stored in the specific area 51 of the flash memory 14 has been reliably erased after the host apparatus 20 has given the above instruction to erase the scan data, the host apparatus 20 gives the instruction to read out the data which is stored at that time in the specific area 51 in accordance with a Read command in some cases. When the SSD device 10 detects that such a data read instruction has been given by the host apparatus 20, the SSD device 10 reads out the data 12a to be overwritten from the RAM 12 by referring to the logical address-physical block conversion table 12b, and sends the data 12a to be overwritten to the host apparatus 20. The host apparatus 20 specifies the specific area 51 by using the logical address. Therefore, since the contents of the logical address-physical block conversion table 12b are updated by carrying out the erasing operation in the manner as described above, an address corresponding to that logical address is the address in the RAM 12 in which the data 12a to be overwritten is stored. Therefore, if the SSD device 10 refers to the logical address-physical block conversion table 12b, then, the SSD device 10 can access the data 12a to be overwritten in the RAM 12 to read out the data 12a to be overwritten, thereby sending the data 12a to be overwritten to the host apparatus 20.

(Operation of SSD Device)

Figure 4:
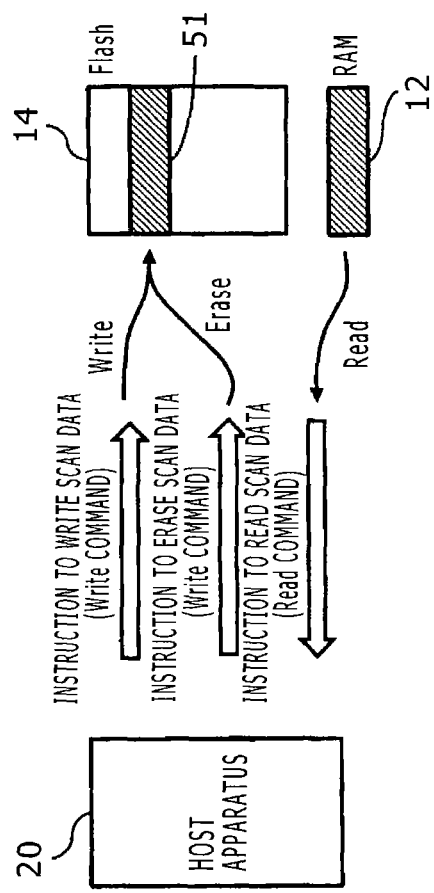
FIG. 4 is a diagram explaining an operation of the SSD device according to the first disclosure.

Next, an operation of the SSD device 10 according to the first disclosure whose outline is shown in FIG. 4 will now be described with reference to sequence diagrams of FIGS. 5 to 9, and a flow chart of FIG. 10. It is noted that in a description which will be given with reference to FIGS. 5 to 10, it is supposed that the SSD device 10 and the host apparatus 20 are connected to each other through the ATA interface of the interfaces each having the general versatility.

Figure 5:
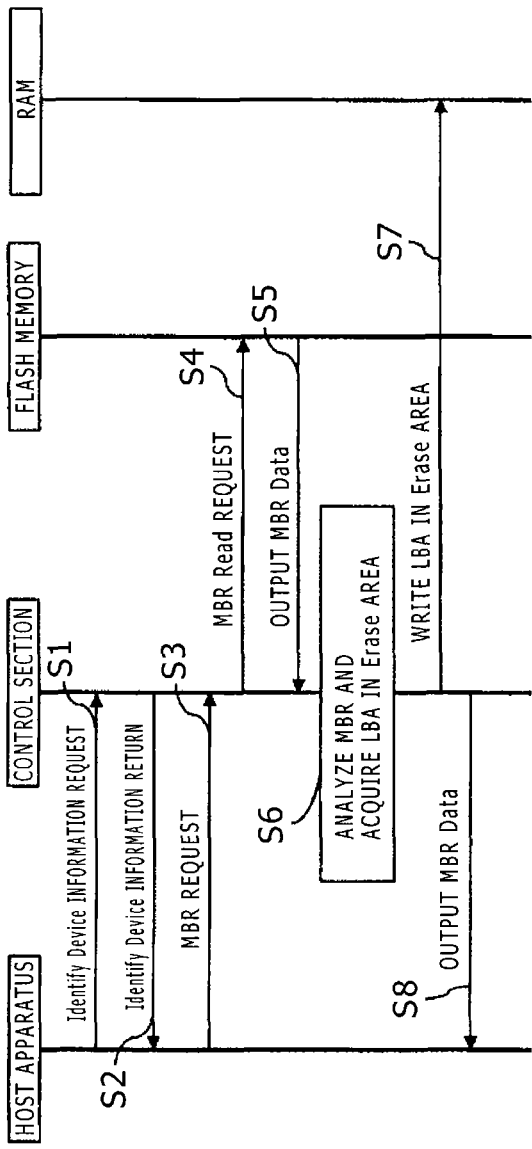
FIG. 5 is a sequence diagram explaining an example of an initial operation of the SSD device according to the first disclosure and an MFP to which the SSD device is mounted.

FIG. 5 is a sequence diagram explaining the transmission/reception of the data between the SSD device 10 and the host apparatus 20, and the operation of the SSD device 10 in a phase of turning-ON of the host apparatus 20 including the SSD device 10. Firstly, in processing in Step S1, for the purpose of acquiring information, inherent to the ATA device, such as a model name and a corresponding transfer mode of the SSD device 10 as the ATA device, the host apparatus 20 transmits a command to request the SSD device 10 to send thereto these pieces of information (Identify Device command). When in processing in Step S1, the interface portion 42 has received the Identify Device command, in processing in Step S2, the control section 40 of the SSD device 10 sends information thereof back to the host apparatus 20 through the interface portion 42. Next, in processing in Step S3, the host apparatus 20 requires the SSD device 10 to send thereto the MBR described above. When the interface portion 42 has received such a request, in processing in Step S4, the control section 40 of the SSD device 10 requests the flash memory 14 to read out the MBR 30 (refer to FIG. 3) stored in the flash memory 14. In processing in Step S5, the control section 40 receives the data on the MBR 30 from the flash memory 14. In processing in Step S6, the control section 40 analyzes the MBR 30 which has been received from the flash memory 14, acquires an LBA in the Erase area (as shown in FIG. 3, the partition C 33 in this case), and extracts both of a start logical address and an end logical address in the Erase area. In processing in Step S7, the control section 40 writes both of the start logical address and the end logical address in the Erase area (the partition C 33) to the RAM 12. Also, in processing in Step S8, the control section 40 sends the data on the MBR 30 which is acquired in the processing in Step S5 to the host apparatus 20 through the interface portion 42.

Figure 6:
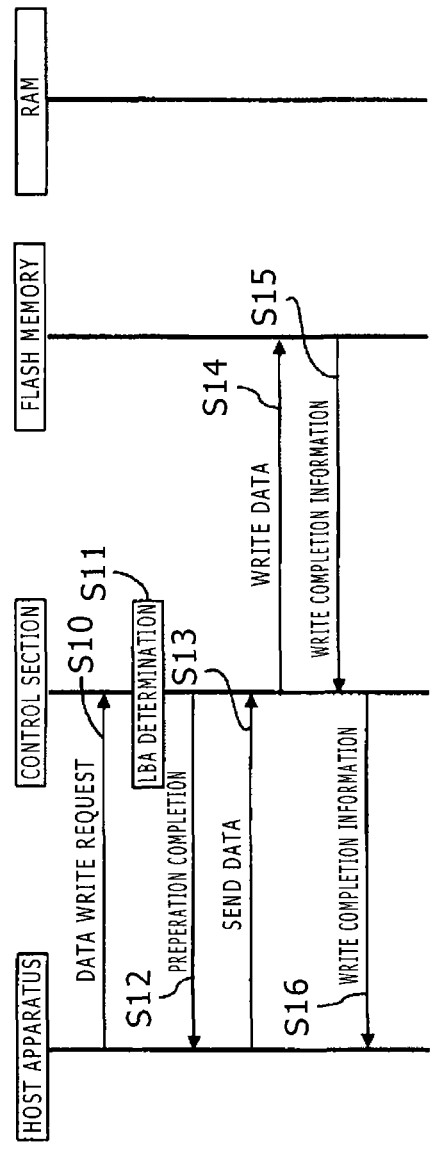
FIG. 6 is a sequence diagram explaining an example of a data writing operation of the SSD device according to the first disclosure and the MFP to which the SSD device is mounted.

Next, FIG. 6 is a sequence diagram explaining transmission/reception of the data between the SSD device 10 and the host apparatus 20, and an operation of the SSD device 10 when the data is written to the non-Erase area of the flash memory 14. Firstly, in processing in Step S10, the logical address with which the data is to be written is specified from the host apparatus 20 to the SSD device 10, and a write instruction is then given from the host apparatus 20 to the SSD device 10. When the interface portion 42 has received such a write instruction, in processing in Step S11, the control section 40 of the SSD device 10 determines whether or not the logical address with which the data is to be written is present in the Erase area by, for example, referring to the start logical address, in the Erase area, with which the data is written to the RAM 12 in the processing in Step S7 shown in FIG. 5. Since in the case shown in FIG. 6, the logical address with which the data is to be written is present in the non-Erase area (as shown in FIG. 3, any one of the partitions A 31 and B 32 in this case), in processing in Step S11, the control section 40 of the SSD device 10 necessarily determines that the logical address with which the data is to be written is absent in the Erase area. In processing in Step S12, the control section 40 informs the host apparatus 20 of the effect that the preparation for the writing operation has been completed through the interface portion 42. In processing in Step S13, the host apparatus 20 sends the data to be written to the SSD device 10. Therefore, in processing in Step S14, the interface portion 42 receives the data to be written, and the control section 40 writes the data which has been sent thereto from the host apparatus 20 to the flash memory 14. As has been described, the area to which the data concerned is written is the non-Erase area (any one of the partitions A 31 and B 32). In processing in Step S15, data write completion information is given from the flash memory 14 to the control section 40. In response to the data write completion information, in processing in Step S16, the control section 40 sends the data write completion information to the host apparatus 20 through the interface portion 42.

Figure 7:
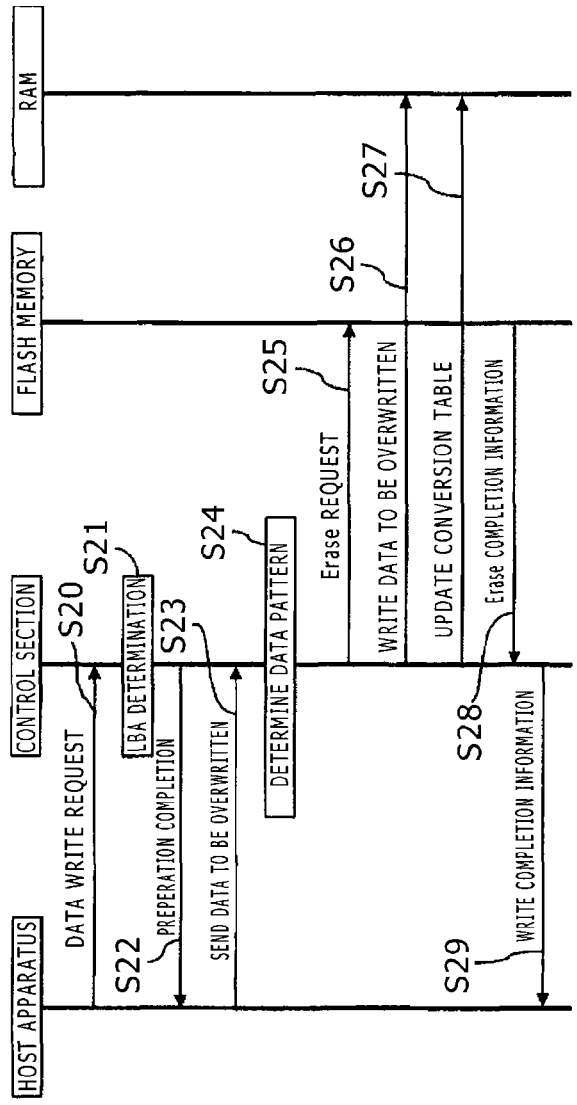
FIG. 7 is a sequence diagram explaining an example of a data erasing operation of the SSD device according to the first disclosure and the MFP to which the SSD device is mounted.

Next, FIG. 7 is a sequence diagram explaining transmission/reception of the data between the SSD device 10 and the host apparatus 20, and an operation of the SSD device 10 in a phase of the overwrite erasing operation for the scan data 330 (refer to FIG. 3) stored in the specific area 51 in the Erase area of the flash memory 14. Firstly, in processing in Step S20, the logical address with which the data is to be written, that is, the address of the specific area 51 in which the scan data 330 is present in this case is specified from the host apparatus 20 to the SSD device 10, and an overwrite instruction is then given from the host apparatus 20 to the SSD device 10. In processing in Step S21, in the control section 40 of the SSD device 10, the interface portion 42 receives such an overwrite instruction. Next, the control section 40 determines whether or not the logical address with which the data is to be overwritten is present in the Erase area by, for example, referring to the start logical address, in the Erase area, with which the data is written to the RAM 12 in the processing in Step S7 shown in FIG. 5. Since in the case shown in FIG. 7, the logical address with which the data is to be written is present in the Erase area (as shown in FIG. 3, the partition C 33 in this case), in processing in Step S21, the control section 40 of the SSD device 10 necessarily determines that the logical address with which the data is to be written is present in the Erase area. Next, in processing in Step S22, the control section 40 informs the host apparatus 20 of the effect that the preparation for the writing operation has been completed through the interface portion 42. In processing in Step S23, the host apparatus 20 sends the data to be overwritten to the SSD device 10. In processing in Step S24, the determination section 43 of the control section 40 determines whether or not the data which is sent from the host apparatus 20 and is then received by the interface portion 42 is the data to be overwritten. A detailed routine as to whether or not the data concerned is the data to be overwritten will be described later. In the case shown in FIG. 7, the data which is sent from the host apparatus 20 is the data to be overwritten which is used to erase the scan data 330. Therefore, in processing in Step S24, the control section 40 necessarily determines that the data which is sent from the host apparatus 20 and is then received by the interface portion 42 is the data to be overwritten. Next, in processing in Step S25, the erasing portion 44 of the control section 40 instructs the physical block including the specific area 51 to carry out the erasing operation. In addition, in processing in Step S26, the control section 40 stores the data 12a to be overwritten (refer to FIG. 1) which is sent thereto from the host apparatus 20 in the RAM 12. In processing in Step S27, the control section 40 updates the contents of the logical address-physical block conversion table 12b (refer to FIG. 1) within the RAM 12. Also, the control section 40 changes the destination corresponding to the logical address in the specific area 51 for which the erasing instruction is given from the physical block for which the erasing operation is carried out to the address in the RAM 12 in which the data 12a to be overwritten is stored. In processing in Step S28, an erasing operation completion information is given from the flash memory 14 to the control section 40. In response to the erasing operation completion information, in processing in Step S29, the control section 40 sends the data write completion information to the host apparatus 20 through the interface portion 42.

Figure 8:
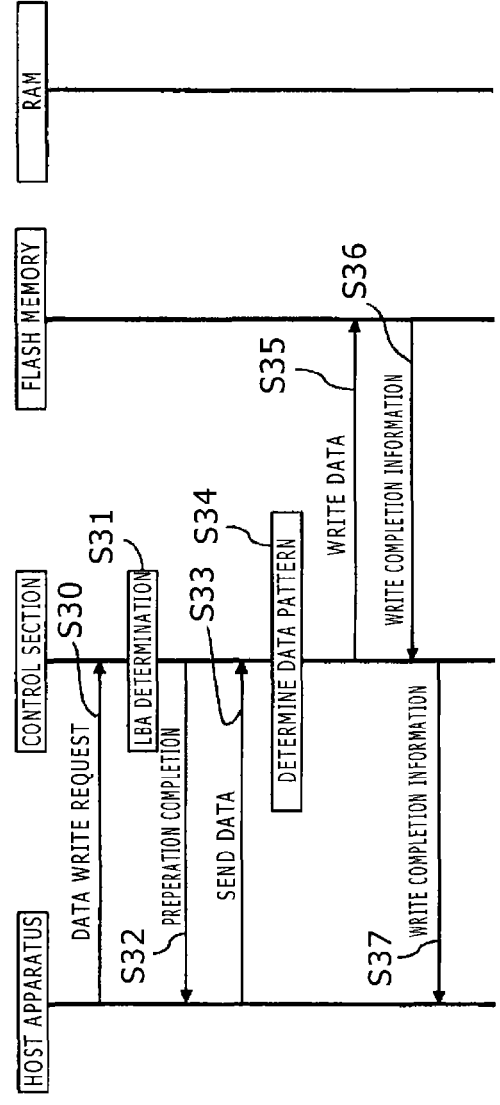
FIG. 8 is a sequence diagram explaining another example of the data writing operation of the SSD device according to the first disclosure and the MFP to which the SSD device is mounted.

Next, FIG. 8 is a sequence diagram explaining transmission/reception of the data between the SSD device 10 and the host apparatus 20, and an operation of the SSD device 10 when the data is written to the Erase area of the flash memory 14. Firstly, in processing in Step S30, the logical address with which the data is to be written, that is, the address in the specific area 51 in which the scan data 330 is present in this case is specified from the host apparatus 20 to the SSD device 10, and a write instruction is then given from the host apparatus 20 to the SSD device 10. In processing in Step S31, in the control section 40 of the SSD device 10, the interface portion 42 receives such a write instruction. Next, the control section 40 determines whether or not the logical address with which the data is to be written is present in the Erase area by, for example, referring to the start logical address, in the Erase area, with which the data is written to the RAM 12 in the processing in Step S7 shown in FIG. 5. Since in the case shown in FIG. 8, the logical address with which the data is to be written is present in the Erase area (as shown in FIG. 3, the partition C 33 in this case), in processing in Step S31, the control section 40 necessarily determines that the logical address with which the data is to be written is present in the Erase area. Next, in processing in Step S32, the control section 40 informs the host apparatus 20 of the effect that the preparation for the writing operation has been completed through the interface portion 42. In processing in Step S33, the host apparatus 20 sends the data to be written to the host apparatus 20. In processing in Step S34, the determination section 43 of the control section 40 determines whether or not the data which is sent from the host apparatus 20 and is then received by the interface portion 42 is the data to be overwritten. In the case shown in FIG. 8, the data which is sent from the host apparatus 20 is the data to be written. Therefore, in processing in Step S34, the control section 40 necessarily determines that the data which is sent from the host apparatus 20 and is then received by the interface portion 42 is not the data to be overwritten. In processing in Step S35, the control section 40 writes the data which has been sent thereto from the host apparatus 20 to the Erase area (the partition C 33) in the flash memory 14. In processing in Step S36, a data write completion information is given from the flash memory 14 to the control section 40. In response to the data write completion information, in processing in Step S37, the control section 40 sends the data write completion information to the host apparatus 20 through the interface portion 42.

Figure 9:
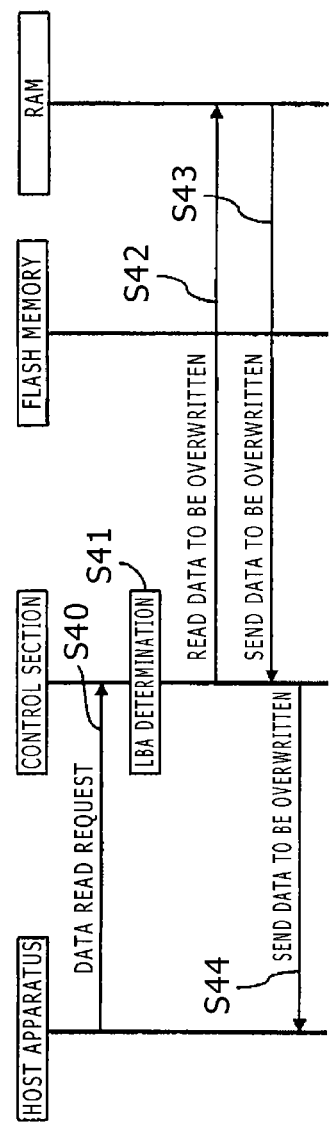
FIG. 9 is a sequence diagram explaining an example of a data reading operation of the SSD device according to the first disclosure and the MFP to which the SSD device is mounted.

Next, FIG. 9 is a sequence diagram explaining transmission/reception of the data between the SSD device 10 and the host apparatus 20, and an operation of the SSD device 10 when the host apparatus 20 reads out the data which is concurrently stored in the specific area 51 for the purpose of confirming whether or not the scan data 330 (refer to FIG. 3) is properly overwritten for the erasing after completion of the operation for overwriting the scan data 330 stored in the specific area 51 in the Erase area of the flash memory 14. Firstly, in processing in Step S40, the logical address, in the specific area 51, with which the scan data 330 is present is specified from the host apparatus 20 to the SSD device 10, and a data read instruction is then given from the host apparatus 20 to the SSD device 10. In processing in Step S41, in the control section 40 of the SSD device 10, the interface portion 42 receives such a data read instruction. Next, the control section 40 specifies an area from which the data is to be actually read out and which corresponds to the logical address specified from the host apparatus 20 by referring to the logical address-physical block conversion table 12b within the RAM 12. In the case shown in FIG. 9, the host apparatus 20 specifies the logical address in the specific area 51 in which the scan data 330 is present. Thus, an address corresponding to the logical address concerned is the address of the data 12a to be overwritten which is stored in the RAM 12 in the manner as described above. Therefore, in processing in Step S42, the transferring portion 45 of the control section 40 reads out the data 12a to be overwritten which is stored in the RAM 12 in the processing in Step S26 shown in FIG. 7. Also, in processing in Step S43, the data 12a to be overwritten is sent from the RAM 12 to the control section 40. In processing in Step S44, the control section 40 sends the data 12a to be overwritten to the host apparatus 20 through the interface portion 42.

Figure 10:
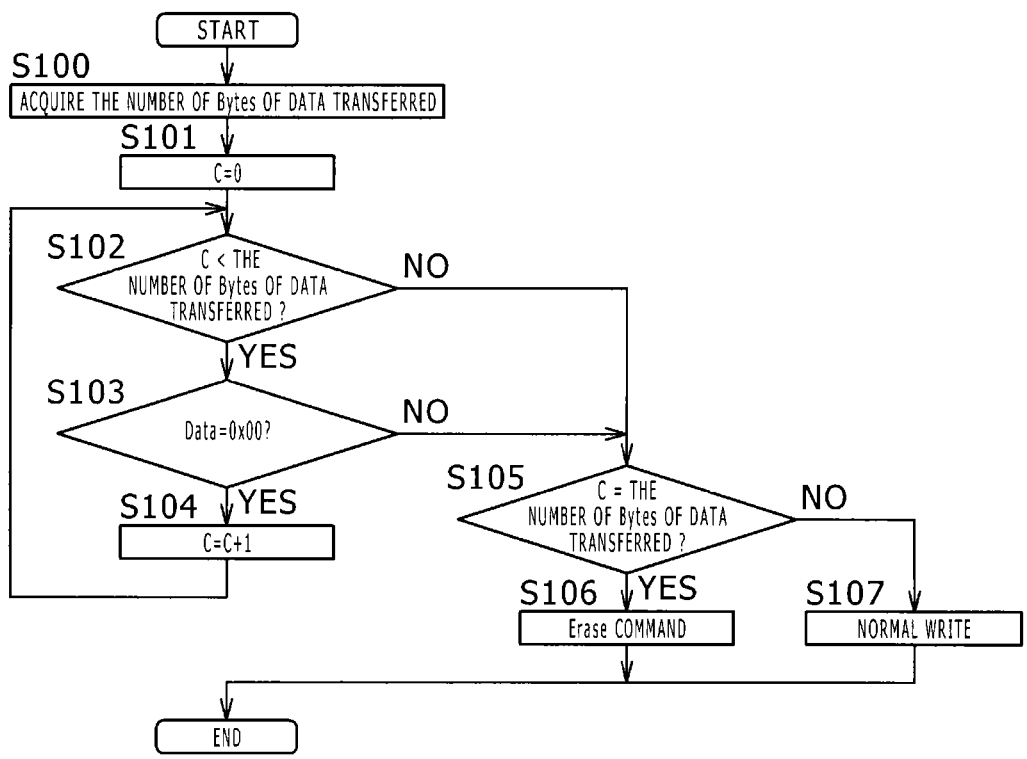
FIG. 10 is a flow chart explaining an operation for pattern determination in the SSD device according to the first disclosure.

Next, FIG. 10 is a flow chart explaining a determination routine, as to whether the data concerned is the data to be overwritten, which is executed in the processing in Step S24 and the like, and which is executed by the determination section 43. In a description which will be given below with reference to FIG. 10, it is supposed that the data to be overwritten which is sent from the host apparatus 20 is predetermined pieces of data which are all "0." Firstly, in processing in Step S100, there is acquired the number of bytes of the data which has been transferred (sent) from the host apparatus 20. Next, in processing in Step S101, a variable C is initialized, and a value of the variable C is set to zero. In processing in Step S102, it is determined whether or not the value of the variable C is smaller than the number of bytes of the data transferred. When it is determined in the processing in Step S102 that the value of the variable C is smaller than the number of bytes of the data transferred (YES in the processing in Step S102), the operation proceeds to processing in Step S103. In contrast, when it is determined in the processing in Step S102 that the value of the variable C is equal to or larger than the number of bytes of the data transferred (NO in the processing in Step S102), the operation proceeds to processing in Step S105. In the processing in Step S103, it is determined whether or not the data which has been transferred is "0" ("0x00" expressed by a hex number in FIG. 10). When it is determined in the processing in Step S103 that the data which has been transferred is "0" (YES in the processing in Step S103), the operation proceeds to processing in Step S104. In contrast, when it is determined in the processing in Step S103 that the data which has been transferred is not "0" (NO in the processing in Step S103), the operation proceeds to processing in Step S105. In the processing in Step S104, the value of the variable C is incremented by one, and next data transferred is read out. In the processing in Step S105, it is determined whether or not the value of the variable C is equal to the number of bytes of the data transferred. When it is determined in the processing in Step S105 that the value of the variable C is equal to the number of bytes of the data transferred (YES in the processing in Step S105), the operation proceeds to processing in Step S106, and it is determined that the data which has been transferred (sent) from the host apparatus 20 is the data to be overwritten. Also, the flash memory 14 is instructed to carry out the erasing operation. In contrast, when it is determined in the processing in Step S105 that the value of the variable C is not equal to the number of bytes of the data transferred (NO in the processing in Step S105), the operation proceeds to processing in Step S107, and it is determined that the operation is the normal data write. Also, the flash memory 14 is instructed to write thereto the data. As has been described, in the routine shown in FIG. 10, it is determined whether or not the individual pieces of data are "0." When it is determined that the individual pieces of data are all "0," it is determined that the data which has been transferred (sent) from the host apparatus 20 is the data to be overwritten.

(Effects of First Disclosure)

As has been described in detail so far, the SSD device 10 according to the first disclosure determines that the data 12a to be overwritten which is used to erase the scan data 330 present in the specific area 51 in the flash memory 14 has been sent from the host apparatus 20. Also, the SSD device 10 gives the erasing instruction to the physical block 51 including the specific area 51 instead of the data 12a to be overwritten, thereby erasing the scan data 330. Therefore, the flash memory 14 merely carries out one operation, whereby the scan data 330 can be reliably erased.

In addition thereto, in the SSD device 10 according to the first disclosure, the host apparatus 20 sends the overwrite instructing command (such as the Write command) and the data 12a to be overwritten which comply with the interface, having the general versatility, such as the ATA interface to the SSD device 10. At this time, the SSD device 10 determines whether or not the overwrite instructing command corresponds to the overwrite erasing instruction. When the SSD device 10 determines that the overwrite instructing command corresponds to the overwrite erasing instruction, the SSD device 10 instructs the flash memory 14 to carry out the erasing operation. Therefore, unlike the existing MFP described above, it is unnecessary to prepare the special command complying with the vender. As a result, it becomes possible to provide the SSD device 10 which can be substituted for the general-purpose HDD without subjecting the host apparatus 20 to the special specification change.

Moreover, in the SSD device 10 according to the first disclosure, the data 12a to be overwritten which has been sent from the host apparatus 20 is stored in the RAM 12, and the data 12a to be overwritten is sent in accordance with the read instruction given by the host apparatus 20. Therefore, even when the SSD device 10 carries out the erasing operation for the specific area 51 in the flash memory 14, it becomes possible to sufficiently respond to the data erasing confirming operation by the host apparatus 20.

In addition, as shown in FIG. 3, in the SSD device 10 according to the first disclosure, with respect to each of the partitions A 31 and B 32 as the non-Erase area, the approximately same area is ensured between the logical address and the physical block, while with respect to the partition C 33 as the Erase area, the partitions A 31 to C 33 are set in such a way that the physical block is smaller in area than the logical address. Therefore, the capacity of the SSD device 10 which is grasped from the host apparatus 20 is the capacity corresponding to the logical address ensured, while since the actual capacity of the SSD device 10 is the capacity corresponding to the physical block, it is possible to reduce the capacity of the SSD device 10 by that amount.

Also, even when the actual capacity of the SSD device 10 is smaller than the capacity corresponding to the logical address in such a manner, since the data 12a to be overwritten is stored in the RAM 12 in the manner as described above, even if the data read instruction for confirming the data erasing has been given from the host apparatus 20, then, it is only necessary to send the data 12a to be overwritten to the host apparatus 20. As a result, the area in which the scan data 330 is stored can be released just after completion of the erasing operation. Also, the new scan data 330 can be immediately written to the area concerned. By carrying out such an operation, the partition C 33 as the Erase area can be effectively utilized, and the smooth operation becomes possible even when with respect to the partition C 33, the area of the physical block is made smaller than that of the physical block.

(Outline of Partition Updating Operation)

The SSD device 10 according to the first disclosure has the features in a partition updating operation as well. Hereinafter, the partition updating operation in the SSD device 10 according to the first disclosure will be described with reference to FIGS. 11 to 13.

Figure 11:
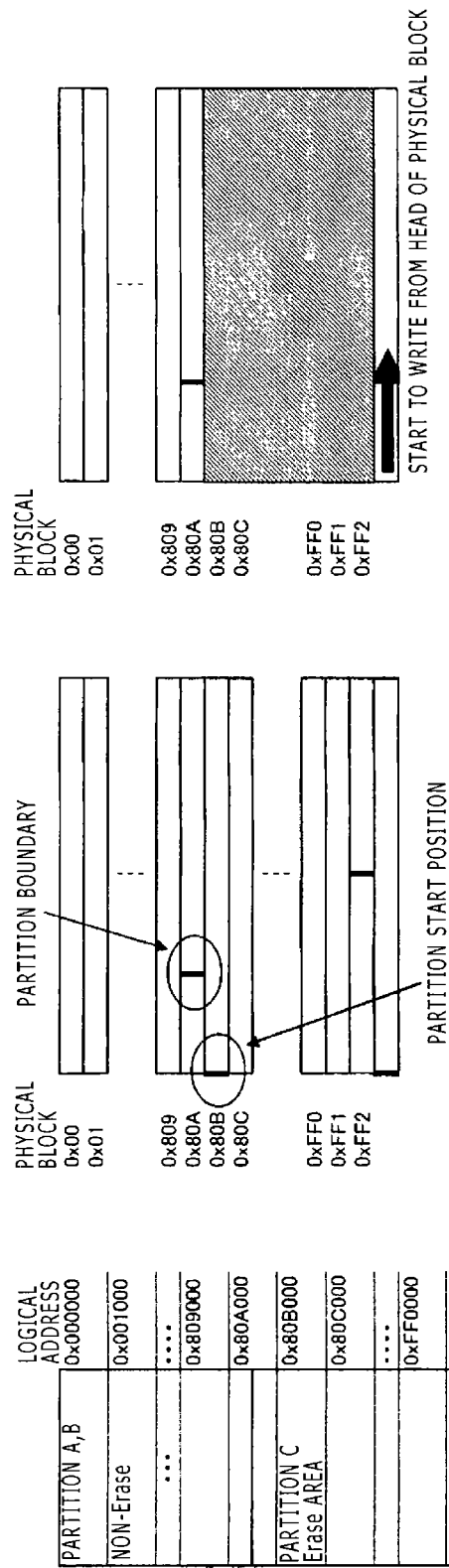
FIG. 11 is a diagram explaining an outline of partition update in the SSD device according to the first disclosure.

FIG. 11 is a diagram explaining the outline of the partition updating operation in the SSD device 10 according to the first disclosure. Normally, in the partition updating operation, each of the partitions is ensured with the logical address, and the actual operation for reading out/writing the data is carried out for the physical block which is specified by the logical address-physical block conversion table 12b described above. Here, the area of each of the partitions, for example, can be set in sectors. Therefore, when seen in physical blocks, it is possible that as shown in FIG. 11, boundaries among the partitions are provided in some physical blocks. In the SSD device 10 according to the first disclosure, when as shown in FIG. 11, the boundary between the partitions is provided within the physical block, a start position of the next partition is set in the head of the next physical block.

Let us consider the case where supposedly, as shown in FIG. 11, the partition in the non-Erase area, and the partition in the Erase area are adjacent to each other, and the boundary between the partitions is present within the physical block. When the erasing instruction is given to the physical block of the flash memory 14 as with the first disclosure, the erasing operation is carried out in blocks. Therefore, the data stored in the portion, which is present in the non-Erase area, of the physical blocks in each of which the boundary of the partitions is present is temporarily evacuated (irrespective of that the data is written thereto). After the erasing instruction is given to the physical block concerned, the data thus evacuated is written thereto again. Thus, such a troublesome operation is requited. Carrying out this operation leads to that the number of times of the rewrite in the flash memory 14 is consumed.

In contrast, according to the SSD device 10 of the first disclosure, since the start position of the partition is necessarily set to the head of the physical blocks, the erasing instruction can be given to the physical block without carrying out the data evacuating work described above, and thus it is possible to suppress that the number of times of the rewrite in the flash memory 14 is consumed.

(Partition Updating Operation)

Figure 12:
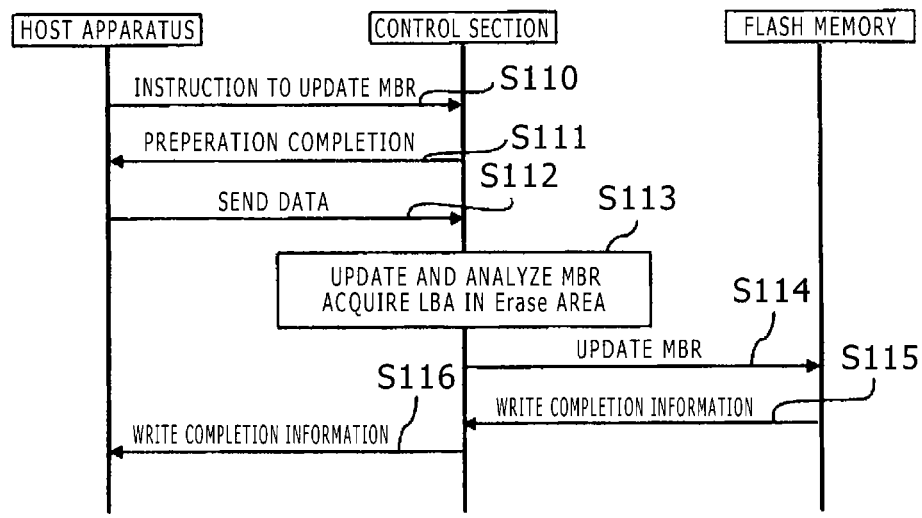
FIG. 12 is a sequence diagram explaining an example of the partition updating operation of the SSD device according to the first disclosure and the MFP to which the SSD device is mounted.

FIG. 12 is a sequence diagram explaining transmission/reception of the data between the SSD device 10 and the host apparatus 20, and an operation of the SSD device 10 in a phase of a partition updating operation. Firstly, in processing in Step S110, for the partition updating operation, the host apparatus 20 gives an instruction to update the MBR stored in the flash memory 14. In processing in Step S111, the control section 40 of the SSD device 10 informs the host apparatus 20 of the effect that the preparation for the MBR updating work has been completed. In response to the information that the preparation for the MBR updating work has been completed in the processing in Step S111, in processing in Step S112, the host apparatus 20 transmits data for MBR updating. Next, in processing in Step S113, the control section 40 analyzes the MBR which has been sent from the host apparatus 20 in the processing in Step S112, and extracts both of a start logical address and an end logical address in the Erase area. Also, the control section 40 grasps the logical address which is present between the boundary of the partitions in the non-Erase area, and the start position of the partition in the Erase area. In processing in Step S114, the control section 40 updates the MBR of the flash memory 14. In processing in Step S115, update data write completion information sent from the flash memory 14 to the MBR is given to the control section 40. In response to the update data write completion information, in processing in Step S116, the control section 40 sends MBR write completion information to the host apparatus 20.

Figure 13:
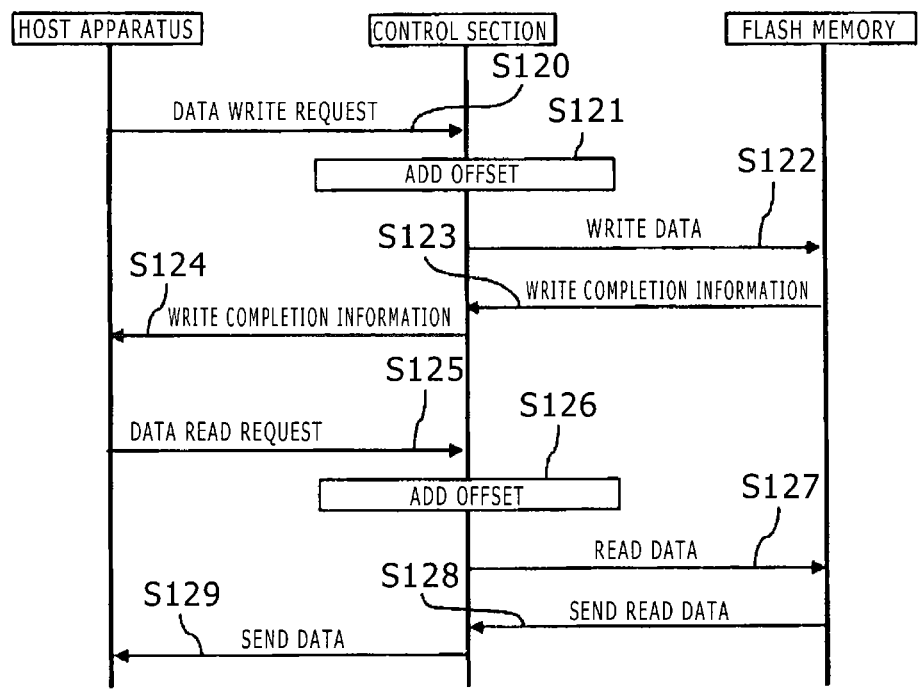
FIG. 13 is a sequence diagram explaining another example of the data writing operation of the SSD device according to the first disclosure, and the MFP to which the SSD device is mounted.

Next, FIG. 13 is a sequence diagram explaining transmission/reception of the data between the SSD device 10 and the host apparatus 20, and an operation of the SSD device 10 when an instruction to write/read the data is given to the logical address between the boundary of the partitions shown in FIG. 11, and the start position of the next partition. Firstly, in processing in Step S120, the host apparatus 20 specifies the logical address with which the data is to be written, and gives a write instruction to the SSD device 10. The logical address which has been specified by the host apparatus 20 in the processing in S120, and to which the data is to be written corresponds to the logical address between the boundary of the partitions in the non-Erase area, and the start partition of the next Erase area. In processing in Step S121, the control section 40 of the SSD device 10 determines whether or not the logical address to which the data is to be written is the logical address which is present between the boundary of the partitions in the non-Erase area, and the start position of the partition in the Erase area based on the result obtained through the MBR analysis which is carried out in the processing in Step S113 shown in FIG. 12. In the case shown in FIG. 13, the area to which the data is to be written is the logical address which is present between the boundary of the partitions in the non-Erase area and the start partition of the partition in the Erase area. Therefore, in the processing in Step S121, the control section 40 of the SSD device 10 necessarily determines that the logical address to which the data is to be written is the logical address which is present between the boundary of the partitions in the non-Erase area and the start position of the partition in the Erase area. Next, in processing in Step S122, the control section 40 writes the data which has been sent thereto from the host apparatus 20 to an area, in the flash memory 14, which is obtained by offsetting the logical address by the logical address which is present between the boundary of the partitions in the non-Erase area and the start position of the partition in the Erase area. The offset stated herein means that the data is either written to or read from the position of the logical address having a value (large value) which proceeds by the logical address which is present between the boundary of the partitions in the non-Erase area and the start position of the partition in the Erase area. In processing in Step S123, the data write completion information is given from the flash memory 14 to the control section 40. In response to the data write completion information, in processing in Step S124, the control section 40 sends the data write completion information to the host apparatus 20.

Subsequently, in processing in Step S125, the logical address from which the data is to be read out is specified from the host apparatus 20 to the SSD device 10, and a read instruction is then given from the host apparatus 20 to the SSD device 10. The logical address which has been specified by the host apparatus 20 in the processing in Step S125 and from which the data is to be read out corresponds to the logical address which is present between the boundary of the partitions in the non-Erase area and the start position of the partition of the next Erase area. In processing in Step S126, the control section 40 of the SSD device 10 determines whether or not the logical address from which the data is to be read out is the logical address which is present between the boundary of the partitions in the non-Erase area and the start position of the partition of the next Erase area. In the case shown in FIG. 13, the area to which data is to be written is the logical address which is present between the boundary of the partitions in the non-Erase area and the start partition in the Erase area. Therefore, in the processing in Step S126, the control section 40 of the SSD device 10 necessarily determines that the logical address from which the data is to be read out is the logical address which is present between the boundary of the partitions in the non-Erase area and the start position of the partition in the Erase area. Next, in processing in Step S127, the control section 40 reads out the data stored in an area, in the flash memory 14, which is obtained by offsetting the logical address by the logical address which is present between the boundary of the partitions in the non-Erase area and the start position of the partition in the Erase area. In processing in Step S128, the data which has been read out from the flash memory 14 is sent to the control section 40. In response to this operation, in processing in Step S129, the control section 40 sends the data thus read out to the host apparatus 20.

As has been described so far, in the SSD device 10 according to the first disclosure, the start position of the partition is necessarily located in the head of the physical block. Also, the data is either written to or read out from the position, in the flash memory 14, which is obtained by offsetting the logical address by the logical address which is present between the boundary of the partitions in the non-Erase area and the start position of the partition in the Erase area. Therefore, there is carried out no operation for writing/reading out the data to/from the area which is present between the boundary of the partitions in the non-Erase area and the start position of the partition in the Erase area. As a result, since it is ensured that no data has been written to that area at all, the erasing instruction can be given to the physical block without carrying out the data evacuating work described above, and it is possible to suppress that the number of times of rewrite in the flash memory 14 is consumed.

(Second Disclosure)

Figure 14:
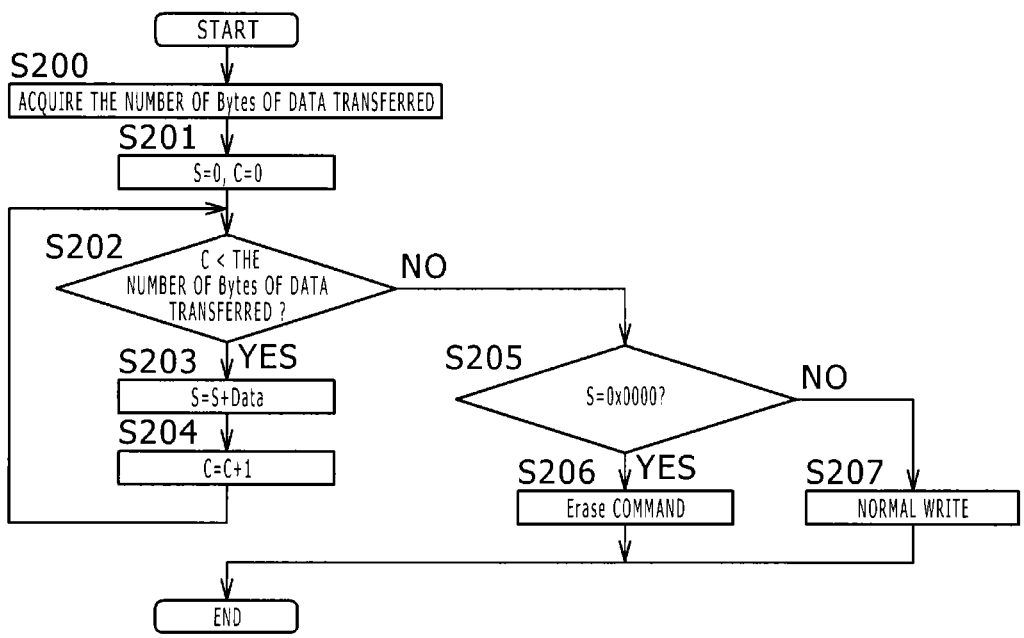
FIG. 14 is a flow chart explaining an operation for pattern determination in an SSD device according to a second disclosure.

FIG. 14 is a flow chart explaining a determination routine, as to whether or not the data which has been transferred (sent) from the host apparatus 20 is the data to be overwritten, which is executed in a determination section 43 in an SSD device according to a second disclosure. The SSD device according to the second disclosure is identical to the SSD device according to the first disclosure except for the routine as to whether or not the data which has been transferred (sent) from the host apparatus 20 is the data to be overwritten. Therefore, the same constituent elements as those in the SSD device 10 of the first disclosure are designated by the same reference numerals or symbols, respectively, and a description thereof is simplified. In addition, in the following description, it is supposed that the data to be overwritten sent from the host apparatus 20 are the predetermined pieces of data which are all "0."

Firstly, in processing in Step S200, there is acquired the number of bytes of the data which have been transferred (sent) from the host apparatus 20. Next, in processing in Step S201, both of the variables C and S are initialized to set the values thereof to zero. In processing in Step S202, it is determined whether or not the value of the variable C is smaller than the number of bytes of the data transferred. When it is determined in the processing in Step S202 that the value of the variable C is smaller than the number of bytes of the data transferred (YES in the processing in Step S202), the operation proceeds to processing in Step S203. In contrast, when it is determined in the processing in Step S202 that the value of the variable C is equal to or larger than the number of bytes of the data transferred (NO in the processing in Step S202), the operation proceeds to processing in Step S205. In the processing in Step S203, the data which has been transferred is added to the value of the variable S. In the processing in Step S204, the value of the variable C is incremented by one, and the next data transferred is read out. In the processing in Step S205, it is determined whether or not the value of the variable S is equal to "0" ("0x0000" expressed by a hex number in FIG. 14). When it is determined in the processing in Step S205 that the value of the variable S is equal to "0" (YES in the processing S205), the operation proceeds to processing in Step S206. In the processing in Step S206, it is determined that the data which has been transferred (sent) from the host apparatus 20 is the data to be overwritten, and the flash memory 14 is then instructed to carry out the erasing operation. In contrast, when it is determined in the processing in Step S205 that the value of the variable S is not equal to "0" (NO in the processing S205), the operation proceeds to processing in Step S207. In the processing in Step S207, it is determined that the operation is the normal data write, and the flash memory 14 is then instructed to write thereto the data. In such a manner, in the routine shown in FIG. 14, the addition value S of the individual pieces of data is calculated. When the addition value S of the individual pieces of data is "0," it is determined that the data which has been transferred (sent) from the host apparatus 20 is the data to be overwritten.

Therefore, according to the SSD device 10 as well of the second disclosure, it is possible to obtain the same effects as those in the SSD device 10 of the first disclosure described above.

(Third Disclosure)

Figure 15:
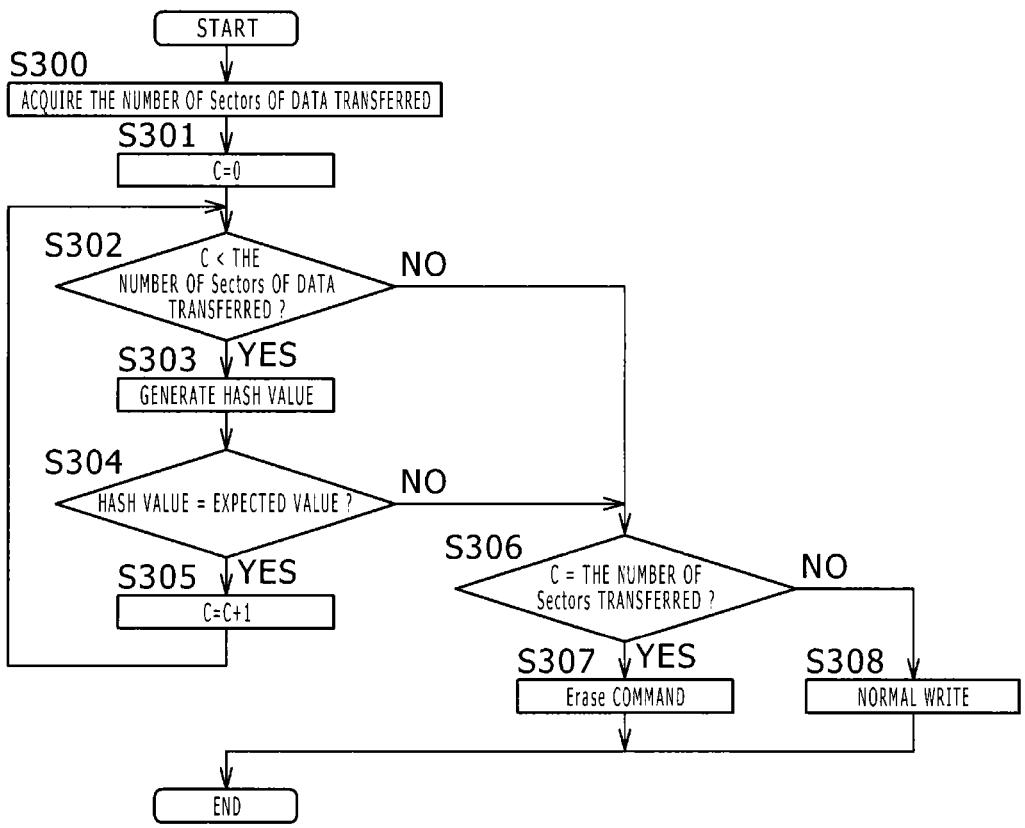
FIG. 15 is a flow chart explaining an operation for pattern determination in an SSD device according to a third disclosure.

FIG. 15 is a flow chart explaining a determination routine, as to whether or not the data which has been transferred (sent) from the host apparatus 20 is the data to be overwritten, which is executed in a determination section 43 in an SSD device according to a third disclosure.

Firstly, in processing in Step S300, there is acquired the number of sectors of the data which have been transferred (sent) from the host apparatus 20. Next, the variable C is initialized to set the value thereof to zero. In processing in Step S302, it is determined whether or not the value of the variable C is smaller than the number of sectors of the data transferred. When it is determined in the processing in Step S302 that the value of the variable C is smaller than the number of sectors of the data transferred (YES in the processing in Step S302), the operation proceeds to processing in Step S303. In contrast, when it is determined in the processing in Step S302 that the value of the variable C is equal to or larger than the number of sectors of the data transferred (NO in the processing in Step S302), the operation proceeds to processing in Step S306. In the processing in Step S303, a hash value of the data which has been transferred is calculated. Here, the hash value may be calculated from a known hash function, that is, a Message Digest Algorithm 2 (MD2) as an example. In processing in Step S304, it is determined whether or not the hash value calculated in the processing in Step S303 is equal to an expected value. When it is determined in the processing in Step S304 that the hash value calculated in the processing in Step S303 is equal to the expected value (YES in the processing in Step S304), the operation proceeds to processing in Step S305. In contrast, when it is determined in the processing in Step S304 that the hash value calculated in the processing in Step S303 is not equal to the expected value (NO in the processing in Step S304), the operation proceeds to processing in Step S306. Here, the expected value is the hash value when the data is "0." In the processing in Step S305, the value of the variable C is incremented by one, and the next data transferred is read out. In the processing in Step S306, it is determined whether or not the value of the variable C is equal to the number of sectors of the data transferred. When it is determined in the processing in Step S306 that the value of the variable C is equal to the number of sectors of the data transferred (YES in the processing in Step S306), the operation proceeds to processing in Step S307. In the processing in Step S307, it is determined that the data which has been transferred (sent) from the host apparatus 20 is the data to be overwritten, and the flash memory 14 is then instructed to carry out the erasing operation. In contrast, when it is determined in the processing in Step S306 that the value of the variable C is not equal to the number of sectors of the data transferred (NO in the processing in Step S306), the operation proceeds to processing in Step S308. In the processing in Step S308, it is determined that the operation is the normal data write, and the flash memory 14 is then instructed to write thereto the data. In such a manner, in the routine shown in FIG. 15, the hash value of each of the pieces of data is calculated. When the hash value is equal to the expected value as the hash value when the data is "0," it is determined that the data which has been transferred (sent) from the host apparatus 20 is the data to be overwritten.

Therefore, according to the SSD device 10 as well of the third disclosure, it is possible to obtain the same effects as those in each of the SSD devices 10 of the first and second disclosures described above.

(Fourth Disclosure)

Figure 16:
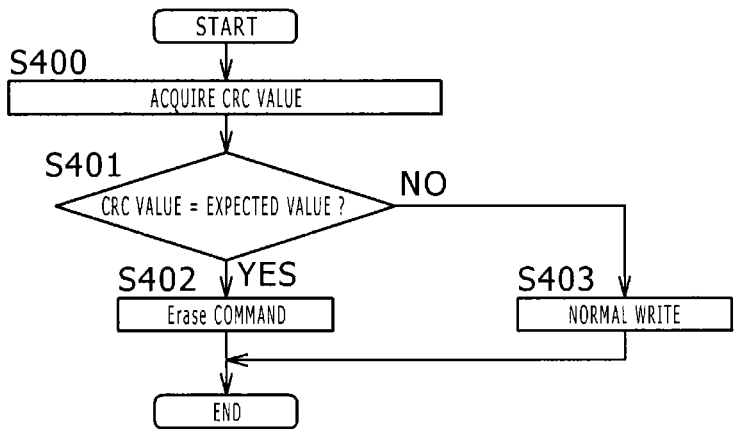
FIG. 16 is a flow chart explaining an operation for pattern determination in an SSD device according to a fourth disclosure.

FIG. 16 is a flow chart explaining a determination routine, as to whether or not the data which has been transferred (sent) from the host apparatus 20 is the data to be overwritten, which is executed in a determination section 43 in an SSD device according to a fourth disclosure.

Firstly, in processing in Step S400, there is calculated a Cyclic Redundancy Check (CRC) value of the data which has been transferred from the host apparatus 20. In processing in Step S401, it is determined whether or not the CRC value calculated in the processing in Step S400 is equal to an expected value. When it is determined in the processing in Step S401 that the CRC value calculated in the processing in Step S400 is equal to the expected value (YES in the processing in Step S401), the operation proceeds to processing in Step S402. In the processing in Step S402, it is determined that the data which has been transferred (sent) from the host apparatus 20 is the data to be overwritten, and the flash memory 14 is then instructed to carry out the erasing operation. In contrast, when it is determined that the CRC value calculated in the processing in Step S400 is not equal to the expected value (NO in the processing in Step S401), the operation proceeds to processing in Step S403. In the processing in Step S403, it is determined that the operation is the normal data write, and the flash memory 14 is then instructed to write thereto the data. In such a manner, in the routine shown in FIG. 16, the CRC value of the data is calculated. When the CRC value concerned is equal to the expected value as the CRC value when the data is "0," it is determined that the data which has been transferred (sent) from the host apparatus 20 is the data to be overwritten.

Therefore, according to the SSD device 10 as well of the fourth disclosure, it is possible to obtain the same effects as those in each of the SSD devices 10 of the first to third disclosures described above.

(Fifth Disclosure)

Figure 17:
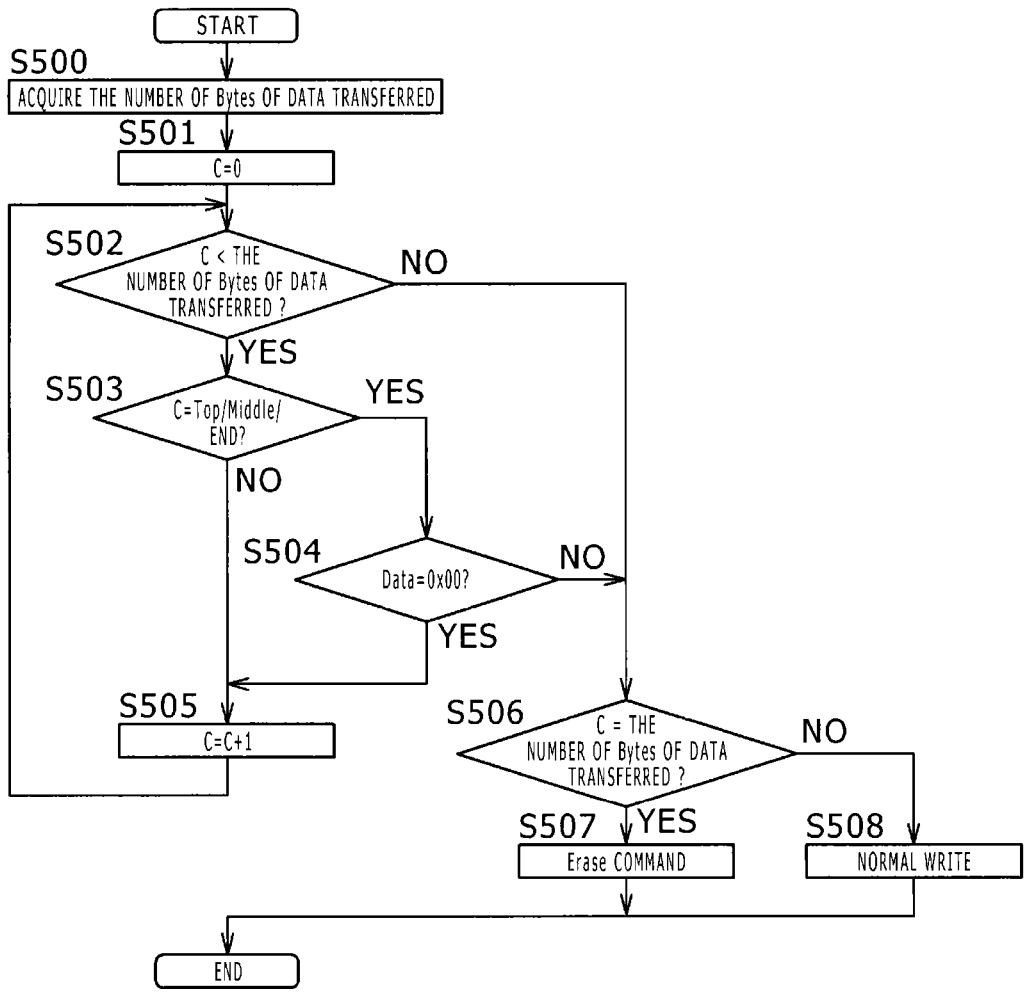
FIG. 17 is a flow chart explaining an operation for pattern determination in an SSD device according to a fifth disclosure.

FIG. 17 is a flow chart explaining a determination routine, as to whether or not the data which has been transferred (sent) from the host apparatus 20 is the data to be overwritten, which is executed in a determination section 43 in an SSD device according to a fifth disclosure.

Firstly, in processing in Step S500, there is acquired the number of bytes of the data which has been transferred (sent) from the host apparatus 20. Next, in processing in Step S501, both of the variables C and S are initialized to set the values thereof to zero. In processing in Step S502, it is determined whether or not the value of the variable C is smaller than the number of bytes of the data transferred. When it is determined in the processing in Step S502 that the value of the variable C is smaller than the number of bytes of the data transferred (YES in the processing in Step S502), the operation proceeds to processing in Step S503. In contrast, when it is determined in the processing in Step S502 that the value of the variable C is equal to or larger than the number of bytes of the data transferred (NO in the processing in Step S502), the operation proceeds to processing in Step S506. In the processing in Step S503, it is determined whether or not the value of the variable C is the first value, the middle value or the final value of the number of bytes of the data transferred which has been acquired in the processing in Step S502. When it is determined in the processing in Step S503 that the value of the variable C is the first value, the middle value or the final value of the number of bytes of the data transferred which has been acquired in the processing in Step S502 (YES in the processing in Step S503), the operation proceeds to processing in Step S504. In contrast, when it is determined in the processing in Step S503 that the value of the variable C is not the first value, the middle value or the final value of the number of bytes of the data transferred which has been acquired in the processing in Step S502 (NO in the processing in Step S503), the operation proceeds to processing in Step S505. In the processing in Step S504, it is determined whether or not the data which has been transferred is "0" ("0x00" expressed by a hex number in FIG. 17). When it is determined in the processing in Step S504 that the data which has been transferred is "0" (YES in the processing in Step S504), the operation proceeds to processing in Step S505. In contrast, when it is determined in the processing in Step S504 that the data which has been transferred is not "0" (NO in the processing in Step S504), the operation proceeds to processing in Step S506. In the processing in Step S505, the value of the variable C is incremented by one, and the next data transferred is read out. In the processing in Step S506, it is determined whether or not the value of the variable C is equal to the number of bytes of the data transferred. When it is determined in the processing in Step S506 that the value of the variable C is equal to the number of bytes of the data transferred (YES in the processing in Step S506), the operation proceeds to processing in Step S507. In the processing in Step S507, it is determined that the data which has been transferred (sent) from the host apparatus 20 is the data to be overwritten, and the flash memory 14 is then instructed to carry out the erasing operation. In contrast, when it is determined in the processing in Step S506 that the value of the variable C is not equal to the number of bytes of the data transferred (NO in the processing in Step S506), the operation proceeds to processing in Step S508. In the processing in Step S508, it is determined that the operation is the normal data write, and the flash memory 14 is then instructed to write thereto the data. In such a manner, in the routine shown in FIG. 17, the first value, the middle value, and the final value of the data which has been transferred are extracted. Also, when the first, middle, and final values of the data thus extracted are all "0," it is determined that the data which has been transferred (sent) from the host apparatus 20 is the data to be overwritten.

Therefore, according to the SSD device 10 as well of the fifth disclosure, it is possible to obtain the same effects as those in each of the SSD devices 10 of the first to fourth disclosures described above.

(Modifications)

A detail of the storage device of the present disclosure is by no means limited to the disclosures described above, and various kinds of modifications can be made.

In each of the disclosures described above, the routine for the overwrite erasing determination has been described above on the assumption that the predetermined pieces of data to be overwritten which have been sent from the host apparatus and which are used for the overwrite erasing are all "0." However, as an example, it is possible to cope with any suitable situation by suitably changing the routine as long as it is possible to specify the predetermined pieces of data to be overwritten which have been sent from the host apparatus and which are used for the overwrite erasing. In addition, the routine for the overwrite erasing determination is by no means limited to those which have been described in the disclosures described above.

In addition, in the first disclosure described above of the present disclosure, as shown in FIG. 5, the MBR of the flash memory is acquired in the phase of the activation, and the logical address in the Erase area is acquired from the MBR concerned. However, the present disclosure is by no means limited thereto. For example, it is only necessary that when the partition is created in the phase of the shipping of the host apparatus having the storage device incorporated therein, the logical address of the partition corresponding to the Erase area is acquired, and the logical address concerned is set in the storage device initialization command which is sent from the host apparatus. As a result, the storage device can acquire the logical address in the Erase area by carrying out the storage device initializing operation. Alternatively, a (vendor-dependent) command peculiar to the host apparatus may be prepared, and the logical address of the partition corresponding to the Erase area may be previously set in this command.

In addition, in the first disclosure described above, the SSD device itself generates the data to be overwritten which is stored in the RAM. However, the data to be overwritten which have been sent during the overwrite erasing instruction given from the host apparatus may also be stored in the RAM on a case-by-case basis.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a NAND type flash memory;
circuitry configured to control writing/reading of data to/from the NAND type flash memory; and
an interface configured to connect the information processing apparatus to a host apparatus, wherein
the circuitry is configured to
determine whether to erase data stored in a specific area within the NAND type flash memory by overwriting the data based on whether an overwrite command is received from the host apparatus via the interface; and
erase a physical block including the specific area when it is determined to erase the data by removing electric charges in the NAND type flash memory in the physical block including the specific area.

2. The information processing apparatus of claim 1, wherein the NAND type flash memory is divided into plural partitions.

3. The information processing apparatus of claim 2, wherein each of the plural partitions is started at a head of the physical block.

4. The information processing apparatus of claim 3, further comprising:
a storage medium configured to store the data to be overwritten upon receiving the overwrite command from the host apparatus.

5. The information processing apparatus of claim 4, wherein the data to be overwritten is received from the host apparatus via the interface.

6. The information processing apparatus of claim 4, wherein the circuitry is further configured to control the interface to transmit the data to be overwritten stored in the storage medium to the host apparatus when an instruction to read the data within the specific area is received from the host apparatus.

7. The information processing apparatus of claim 1, further comprising:
a storage medium configured to store the data to be overwritten upon receiving the overwrite command from the host apparatus.

8. The information processing apparatus of claim 7, wherein the data to be overwritten is received from the host apparatus via the interface.

9. The information processing apparatus of claim 7, wherein the circuitry is further configured to control the interface to transmit the data to be overwritten stored in the storage medium to the host apparatus when an instruction to read the data within the specific area is received from the host apparatus.

10. An information processing method performed by an information processing apparatus including a NAND type flash memory; circuitry configured to control writing/reading of data to/from the NAND type flash memory; and an interface configured to connect the information processing apparatus to a host apparatus, the method comprising:
determining, by the circuitry, whether to erase data stored in a specific area within the NAND type flash memory by overwriting the data based on whether an overwrite command has been received from the host apparatus via the interface; and
erasing, by the circuitry, a physical block including the specific area when it is determined to erase the data by removing electric charges in the NAND type flash memory in the physical block including the specific area.

11. A non-transitory computer-readable medium including computer-program instructions, which when executed by an information processing apparatus including a NAND type flash memory; circuitry configured to control writing/reading of data to/from the NAND type flash memory; and an interface configured to connect the information processing apparatus to a host apparatus, cause the information processing apparatus to:
determine whether to erase data stored in a specific area within the NAND type flash memory by overwriting the data based on whether an overwrite command has been received from the host apparatus via the interface; and
erase a physical block including the specific area when it is determined to erase the data by removing electric charges in the NAND type flash memory in the physical block including the specific area.

* * * * *